United States Patent Office 3,053,847
Patented Sept. 11, 1962

3,053,847
PHOSPHORUS COMPOUNDS AND PROCESSES FOR THEIR PRODUCTION
Hans-Gerd Schicke, Wuppertal-Elberfeld, Germany, assignor to Farbenfabriken Bayer Aktiengesellschaft, Leverkusen, Germany, a corporation of Germany
No Drawing. Filed Sept. 26, 1961, Ser. No. 140,700
Claims priority, application Germany Oct. 1, 1960
12 Claims. (Cl. 260—306.7)

The present invention relates to and has as its objects new and useful insecticidal compounds and processes for their production. Generally, the new compounds of this invention may be represented by the following general formula

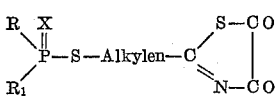

In the above formula X stands for a member selected from the group consisting of oxygen and sulfur. R and $R_1$ stand for radicals which form together with the remaining molecule radical a (di)-thiophosphoric (phosphonic or phosphinic) acid derivative, whereas alkylene may also be further substituted, if desired. As radicals which represent together with the remaining molecule radical a derivative of phosphoric (phosphonic or phosphinic) acids, the following may be mentioned, for example, the methyl, ethyl, ethylene, butyl, butylene, hexyl or cyclo hexyl radical whereby the aforesaid saturated or unsaturated aliphatic or cycloaliphatic radicals may be further substituted by halogen atoms, nitro groups, alkoxy groups and the like. The aforesaid radicals may also be linked to the phosphorus atom via hetero atoms such as oxygen, sulfur or nitrogen. Furthermore, R and $R_1$ may be an aryl radical such as, for example, the phenyl, chlorophenyl, nitrophenyl, alkoxyphenyl, or alkylmercaptophenyl radical.

Compounds used as starting materials for the inventive compounds, characterized by the following general formula

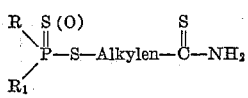

are known already.

In accordance with this invention it has now been found that the above phosphorus-containing derivatives of alkanethiocarboxylic acid amides which may also be designated as S-(amino-thiocarbonyl)-thionophosphoric (phosphonic or phosphinic) acid esters, may be cyclized with oxalyl chloride, derivatives of 2-methyl-thiazoline-dione (4,5) thus being formed. These compounds correspond to the first mentioned general formula.

Aliphatic thiazolindiones have previously not been described in the literature. A new class of compounds becomes obtainable by this surprising reaction.

The new compounds effectively kill insects like flies, mites, aphids, etc. They distinguish themselves especially by a good contact-insecticidal activity and at the same time by an activity on eating insects such as caterpillars. The compounds may be used in the same manner as other known phosphoric acid insecticides, i.e. in a concentration from about .00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like.

The new compounds may furthermore be used in combination with each other or with known insecticides, fertilizers etc.

As an example for the special utility of the inventive compounds the compound of the following formula

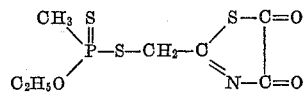

has been tested against spider mites.

Aqueous dilutions of the compound have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting at last this premixture with water to the desired concentration indicated in the following paragraph.

The test has been carried out as follows: against spider mites (contact-insecticidal action). Bean plants (*Phaseolus vulgaris*) of about 15 inches height are sprayed drip wet with solutions as indicated above. The bean plants have been infested heavily with the two-spotted spider (species *Tetranychus telarius*). Evaluation has been carried out after 24 hours, 48 hours and 8 days. The following results have been obtained: 0.001% solutions kill spider mites to 100%.

The following examples illustrate the process claimed, without, however, limiting it in any way.

*Example 1*

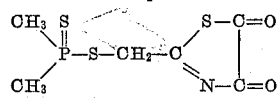

20 grams (0.1 mol) of dimethyl-thionophosphinic acid-S-(thiocarboxamido)-methyl ester are dissolved in 150 cc. of methyl ethyl ketone. 12.7 grams (0.1 mol) of oxalyl chloride are added dropwise at 25–30° C. The mixture is stirred for a further hour. The content of the flask is poured into water, the precipitate filtered off with suction and dried. To purify the crude product it is dissolved in methanol and treated dropwise with water until crystallization starts. The above compound then crystallizes with 1 mol of water of crystallization, M.P. 113° C. (with decomposition), yield 20 grams corresponding to 74% of the theoretical.

On rats per os $LD_{50}$ 250 mg./kg. Spider mites are killed completely with 0.1% solutions. Systemic action with 0.1% solutions=100%.

By the same way there may be obtained the compounds of the following formulae:

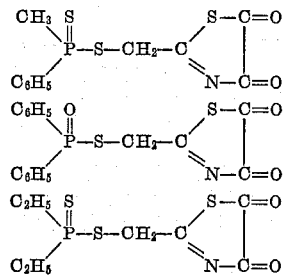

*Example 2*

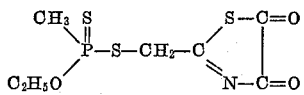

Into a solution of 23 grams (0.1 mol) of methyl-thionophosphonic acid-O-ethyl-S-(thiocarboxamido)-methyl ester in 150 cc. of methyl ether ketone, 12.7 grams (0.1 mol) of oxalyl chloride are added dropwise at a temperature of 25–30° C. Stirring is continued for another hour, and the solvent then removed by vacuum distillation at a bath temperature as low as possible. Upon cooling to about 0° C. the residue solidifies. After recrystallization from acetone, the compound has a melting point of 155–158° C. with decomposition. Yield 21 grams or 74% of the theoretical.

On rats per os $LD_{50}$ 17.5 mg./kg. Aphids are killed to 90% with 0.001% solutions and spider mites are killed completely with 0.001% solutions. The compound has an ovicidal action on the eggs of the red spider.

By the same way there may be obtained the compounds of the following formulae:

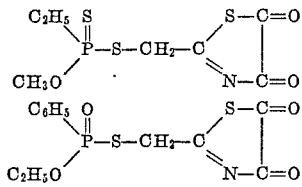

*Example 3*

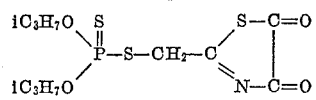

28.7 grams (0.1 mol) of O.O-diisopropyl-S-(thiocarboxamido)-methyl-thionophosphoric acid ester are dissolved in 200 cc. of methyl ethyl ketone. 12.7 grams (0.1 mol) of oxalyl chloride are then added dropwise at 30° C., the mixture is stirred for a further 30 minutes, the solvent then removed by vacuum distillation to a great extent, and the residue treated with 500 cc. of water. The separated oil is taken up in methylene chloride, the solution washed with water and dried. After removal of the solvent, a syrup is obtained which solidifies in crystalline form upon standing for some time. The yield is 29 grams or 85% of the theoretical. Yellow needles are obtained by recrystallization from benzene/ligroin, M.P. 78–80° C.

On rats per os $LD_{50}$ 500 mg./kg. Larvae of flies are killed completely with 0.1% solutions.

By the same way there may be obtained the compounds of the following formulae:

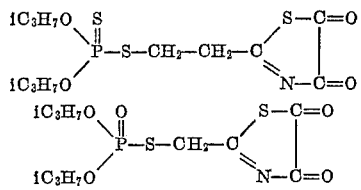

*Example 4*

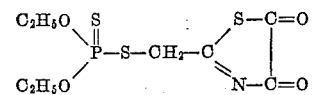

To a solution 39 grams (0.15 mol) of O.O-diethyl-S-(thiocarboxamido)-methyl-thionophosphoric acid ester in 500 cc. of methyl ethyl ketone, 19 grams (0.15 mol) of oxalyl chloride are added dropwise at a temperature of 25–30° C. Stirring is continued for a further 30 minutes, the solvent removed in a vacuum at a bath temperature of 30–40° C., and the residue triturated with petroleum ether. The precipitate is filtered off with suction and washed with petroleum ether. After recrystallization from ligroin/benzene, 34 grams of the new compound of M.P. 100–102° C. are obtained. Yield 72% of the theoretical.

$LD_{50}$ on rats per os 50 mg./kg. Caterpillars are killed completely with 0.1% solutions. Spider mites are killed completely with 0.01% solutions. The compound has an ovicidal action against the eggs of the red spider.

I claim:

1. A compound of the general formula

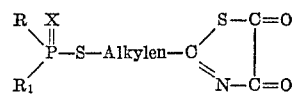

wherein X is a member selected from the group consisting of oxygen and sulfur, R and $R_1$ stand for a member selected from the group consisting of a lower alkyl group, a lower alkoxy group and a phenyl group, and Alkylen stands for a lower alkylene group, alkyl and alkylene in each case having up to 4 carbon atoms.

2. A compound of claim 1 wherein R and $R_1$ are each lower alkyl.

3. A compound of claim 1 wherein R is lower alkyl and $R_1$ is lower alkoxy.

4. A compound of claim 1 wherein R and $R_1$ are each lower alkoxy.

5. A compound of claim 1 wherein R and $R_1$ are each lower alkyl and X is sulfur.

6. A compound of claim 1 wherein R is lower alkyl, $R_1$ is lower alkoxy, and X is sulfur.

7. A compound of claim 1 wherein R and $R_1$ are each lower alkoxy and X is sulfur.

8. The compound of the following formula

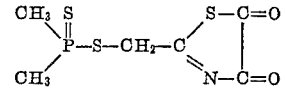

9. The compound of the following formula

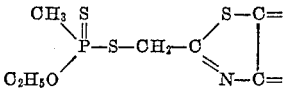

10. The compound of the following formula

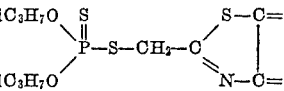

11. The compound of the following formula

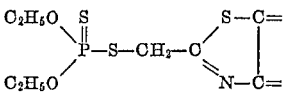

12. A compound of the general formula

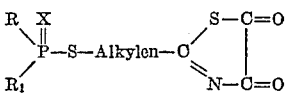

wherein X is a member selected from the group consisting of oxygen and sulfur; R and $R_1$ are each a phenyl group and Alkylen stands for a lower alkylene group, alkyl and alkylen in each case having up to 4 carbon atoms.

No references cited.